US 6,175,493 B1

(12) United States Patent
Gold

(10) Patent No.: US 6,175,493 B1
(45) Date of Patent: Jan. 16, 2001

(54) HEAT TRANSFER FROM BASE TO DISPLAY PORTION OF A PORTABLE COMPUTER

(75) Inventor: Philip Gold, Austin, TX (US)

(73) Assignee: Dell USA, LP, Round Rock, TX (US)

(*) Notice: Under 35 U.S.C. 154(b), the term of this patent shall be extended for 0 days.

(21) Appl. No.: 09/174,201

(22) Filed: Oct. 16, 1998

(51) Int. Cl.[7] .............................. H05K 5/00; H05K 7/20
(52) U.S. Cl. ..................... 361/687; 361/688; 361/695; 174/15.2
(58) Field of Search ..................... 361/687, 688, 361/709, 695; 174/15.2; 165/80.2, 86, 104.33

(56) References Cited

U.S. PATENT DOCUMENTS

| 4,571,456 | 2/1986 | Paulsen et al. . |
| 5,513,070 | 4/1996 | Xie et al. . |
| 5,568,360 | 10/1996 | Penniman et al. . |
| 5,598,320 | 1/1997 | Toedtman et al. . |
| 5,634,350 | 6/1997 | Larson et al. . |
| 5,781,409 | * 7/1998 | Mecredy, III ........................ 361/687 |
| 5,992,155 | * 11/1999 | Kobayashi et al. ..................... 62/3.7 |

* cited by examiner

*Primary Examiner*—Leo P. Picard
*Assistant Examiner*—Tung Minh Bui
(74) *Attorney, Agent, or Firm*—Haynes and Boone, L.L.P.

(57) ABSTRACT

A computer system includes a portable computer having a base portion and a lid portion connected to pivotally open relative to the base portion. A heat generating component is mounted in the base portion. A first heat transfer system is mounted in the base portion adjacent the heat generating component. A second heat transfer system is mounted in the lid portion. A thermal hinge pivotally interconnects the first heat transfer system with the second heat transfer system, so that heat is dissipated from the base portion to the lid portion. A fan mounted in the lid portion actively dissipates heat from the lid portion.

16 Claims, 4 Drawing Sheets

HEAT TRANSFER FROM BASE TO DISPLAY PORTION OF A PORTABLE COMPUTER

This application relates to co-pending U.S. application Ser. No. 09/088,814, filed on Jun. 2, 1998, entitled INTEGRATED HYBRID COOLING WITH EMI SHIELDING FOR A PORTABLE COMPUTER, naming Russell Smith, Mark B. Penniman and Todd Steigerwald as inventors. The co-pending application is incorporated herein by reference in its entirety, and is assigned to the assignee of this invention.

This application relates to co-pending U.S. Pat. application Ser. No. 09/170,150, filed on Oct. 13, 1998, entitled HEAT SINK ASSEMBLY WITH ROTATING HEAT PIPE, naming Charles D. Hood and Peter Liu as inventors. The co-pending application is incorporated herein by reference in its entirety, and is assigned to the assignee of this invention.

BACKGROUND

The disclosures herein relate generally to computer systems and more particularly to heat dissipation for integrated circuits in a portable computer system.

A portable computer is a self-contained personal computer which can be easily moved to and operated at various locations. Portable computers are often referred to as laptop or notebook computers. To be portable, these computers must be small, compact, and lightweight. The conventional portable computer includes a base portion and a lid portion that pivotally opens from the base portion when the portable computer is in use. The lid portion contains a flat panel display such as a liquid crystal display (LCD) or other relatively small display.

Heat distribution is a problem with all computers, especially with portable computers. In the past, heat sinks, heat pipes, and fans have been used to address this problem. One type of heat sink is a metal piece that is thermally coupled to a processor and distributes heat away from the processor. Typically, a heat sink is made of relatively pure aluminum for good thermal conductivity and for reduced weight. Heat sinks add extra pieces to the computer system assembly as well as increasing the complexity of the build and repair operations.

Fans and heat sinks provide a cost effective mechanism for thermally managing many types of portable computer systems. Fans, however, require power and heat sinks require space. While power and space are generally in abundant supply in desktop-type computers, portable computers have a limited supply of both power and space. A commercial advantage is achieved by manufacturing portable computers that are both small and lightweight. Further, portable computers must operate with power conservation in mind. An operating fan may unduly draw upon the batteries of a laptop, making the fan inefficient for long periods of battery-operated use.

Heat pipes are self contained, phase transformation, heat carrying devices, i.e. superconductors of heat. A typical heat pipe may comprise a closed copper tube having a partial vacuum. Liquid in a hot portion of the tube boils at a lower than usual temperature in the partial vacuum. The boiling liquid seeks a cooler spot and thus steam moves to carry heat to the cooler spot where the steam condenses to liquid which returns to the hot end of the tube. The cycle provides a contained circulating heat transfer system.

In U.S. Pat. No. 4,571,456, a portable computer is contained within an outer metal case which physically encapsulates and protects the working components of the computer in the closed, portable configuration. The metal case includes a base which serves as a heat sink for transferring waste heat from heat producing electrical components to the surroundings in the open, operating configuration of the computer. The heat producing components are mounted and located in the base to maximize the transfer of heat to the base. A display housing is pivotally mounted on the base by hinge assemblies for swinging movement between a closed and latched position on the base and an upward and rearwardly inclined angle for viewing by an operator positioned in front of the computer. Stop pins coact with the hinge assemblies for holding the display housing at the desired angle of view, and torsion springs are associated with the hinge assemblies for preventing inadvertent slamming of the display housing against the base during closing. Electrical cables are guided from the base through the hinge assemblies and to the display by cable guides which protect the cables against snagging and unnecessary flexure. A single connector connects an audio circuit on a modem to use either a standard hand set for voice communications or a passive speaker and microphone as an acoustic coupler for data communications.

U.S. Pat. No. 5,513,070 discloses a heat dissipation device for removing heat from a surface mounted integrated circuit component coupled to a printed circuit board in a portable computer. Vias, which are at least partially filled with a heat conductive material, improve heat transfer between a component and a heat conductive block mounted on opposite surfaces of the circuit board. A first section near one end of the heat pipe is attached to the heat conductive block. A second section of the heat pipe is attached to a metal plate which is affixed beneath the keyboard. Heat from the component flows through the vias to the block and is transferred by the heat pipe to the metal plate where it is dissipated.

In U.S. Pat. No. 5, 568,360, a heat transfer system is provided for dissipating thermal energy within the personal computer. The transfer system is designed to move heat from a heat source, such a central processing unit (CPU), to a heatsink arranged upon the portable computer keyboard. The heat transfer mechanism includes a heat slug thermally coupled to the CPU heat source and a heat pipe thermally coupled to a backside surface of a computer keyboard. The heat pipe is designed having minimal thermal gradient, and includes an evaporation/condensation cycle associated with its operation. The heat pipe is preferably orthogonally shaped having at least one flat surface arranged near the intersection of the orthogonal members. The flat section is in registry with a heat source. Movement of the flat section relative to the heat source effectuates abutment and thermal contact therebetween. The present thermal energy transfer system is designed for enhanced heat transfer within a portable computer system without undergoing the disadvantages of bulky finned heatsinks and/or fans.

U.S. Pat. No. 5,598,320 discloses a rotatable and slidable heat pipe apparatus for transferring heat away from a microprocessor chip more rapidly than by heat sink surface area dissipation to the surrounding air alone, comprising a heat sink with an integral cylindrical passageway adapted to receive a first end of a heat pipe shaped like a crankshaft, and a heat spreader formed from a metal plate with a first end rolled up to define a cylindrical opening adapted to receive a second end of the heat pipe. The heat spreader is attached to an underside of a keyboard. Because the heat pipe is able to rotate within the cylindrical passageway and the cylindrical opening, the keyboard can be raised to an open position and lowered to a closed position quickly and simply without the risk of breaking or bending the heat pipe, and manufacturing position tolerances between the heat pipe apparatus components are increased resulting in a simplified manufacturing process. The heat pipe can also be slid into and out of the cylindrical passageway or the cylindrical opening, thereby enabling computer manufacturers to incorporate the heat pipe into portable battery powered notebook-type computer systems designed to allow a user to remove, replace, or swap internal components by simply flipping open or removing the keyboard, and further enabling a user to perform maintenance work or repairs on the computer system without concern for damage to the heat pipe.

U.S. Pat. No. 5,634,351, discloses a two-phase cooling system for a portable computer, the system having an evaporator and a condenser that are both included in either the lid or the base of the computer. The two-phase cooling system is positioned proximate to the computer's heat-producing circuitry, such that the system draws liquid coolant past the circuitry and heat is transferred from the circuitry to the coolant. A fan may also be included to assist in heat rejection from the cooling system. The cooling system includes a flattened heat pipe, with a first side operating as the evaporator and a second side operating as the condenser.

Thermal solutions incorporating heat pipes, heat sinks and fans have become well established in notebook cooling. Heat, traveling from the processor along a heat pipe to a heat sink/radiator, is "actively" removed from the notebook by the air the fan pulls or pushes across the radiator's fins. Traditionally, the components in this type of thermal solution have been located close to the processor in the notebook base. However, as more components crowd into the base of the notebook, the problem of providing a thermal solution sized to adequately handle growing heat loads becomes more difficult.

Therefore, what is needed is an active thermal solution having heat dissipating components located in the lid portion of the portable computer, so that heat generated in the base portion can be routed to the lid and dissipated therefrom without consuming valuable component space in the base portion.

SUMMARY

One embodiment, accordingly, provides a thermal solution using heat pipes and a thermal hinge for routing component generated heat from the base portion of the portable computer to the lid portion thereof adjacent a display panel mounted therein. The heat is actively removed from the lid by a fan. To this end, a computer system includes a portable computer having a base portion and a lid portion pivotally connected to the base portion. A heat generating component is mounted in the base portion. A first heat transfer system is mounted in the base portion adjacent the heat generating component. A second heat transfer system is mounted in the lid portion. A thermal hinge interconnects the first heat transfer system with the second heat transfer system so that heat is dissipated from the base portion to the lid portion, and then routed out of the computer.

A principal advantage of this embodiment is that heat is transferred out of the base portion of the portable computer to the lid portion. Useful component space in the base portion is conserved. An active thermal solution including a heat sink and a fan are provided in the lid portion adjacent the display panel.

DETAILED DESCRIPTION OF THE PREFERRED EMBODIMENT

Figure 1:
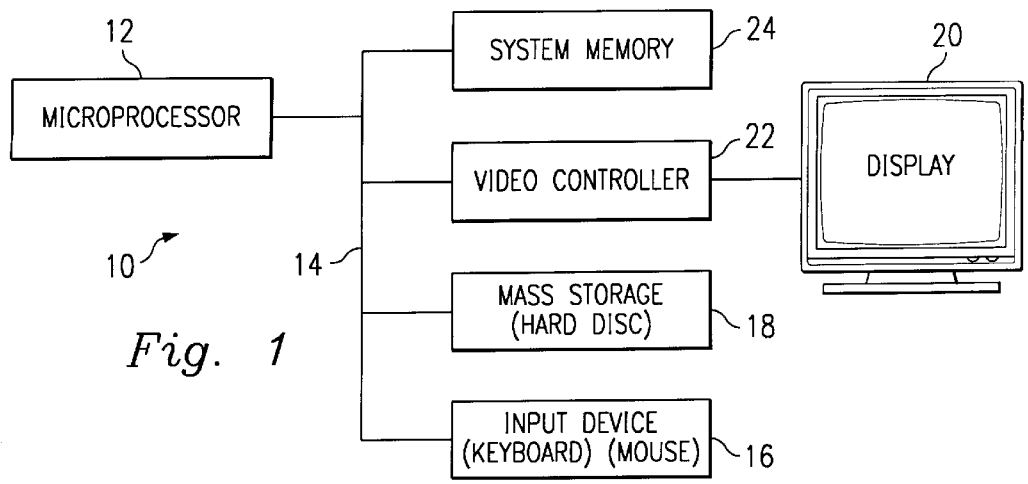
FIG. 1 is a diagrammatic view illustrating an embodiment of a computer system.

In one embodiment, a computer system 10, FIG. 1, includes a microprocessor 12, which is connected to a bus 14. Bus 14 serves as a connection between microprocessor 12 and other components of computer system 10. An input device 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 12 by a video controller 22. A system memory 24 is coupled to microprocessor 12 to provide the microprocessor with fast storage to facilitate execution of computer programs by microprocessor 12. It should be understood that other busses and intermediate circuits can be deployed between the components described above and microprocessor 12 to facilitate interconnection between the components and the microprocessor.

Figure 2:
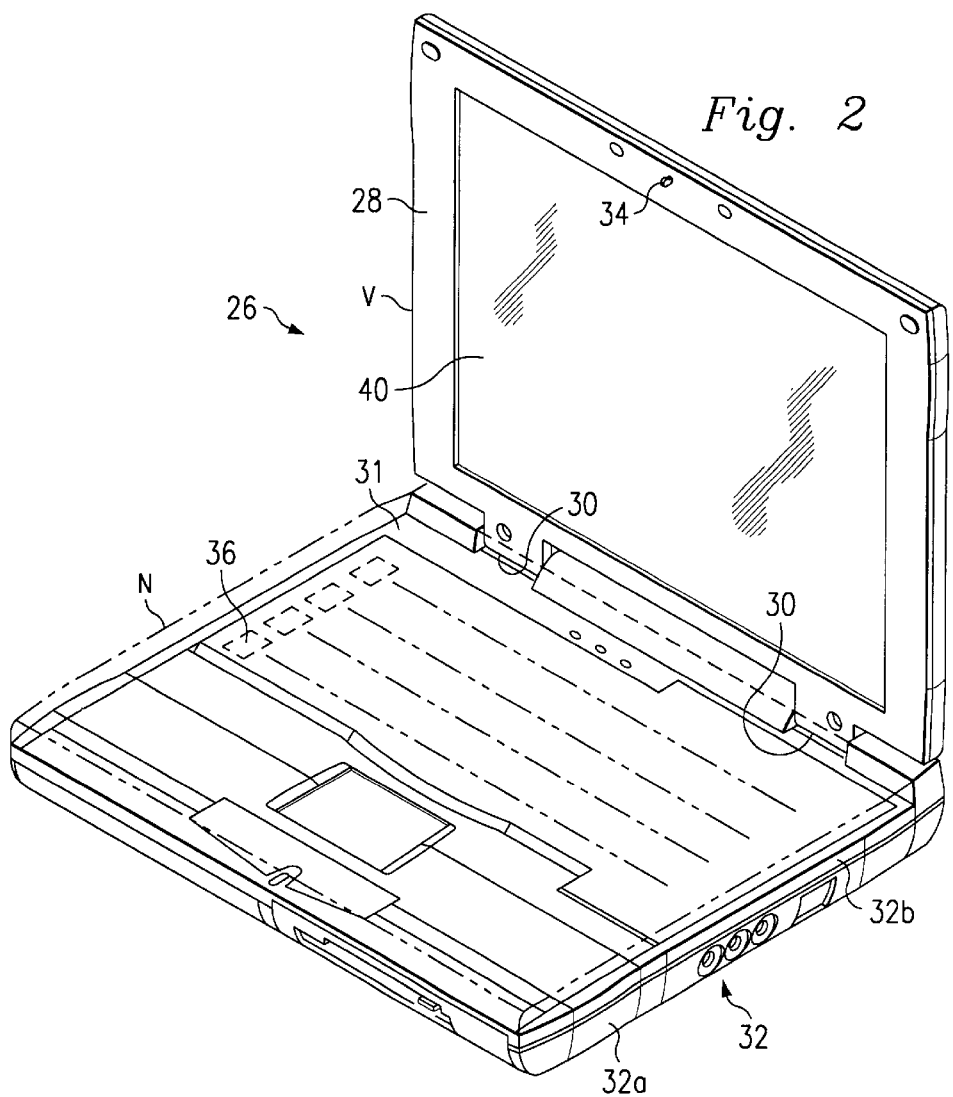
FIG. 2 is a perspective view illustrating an embodiment of a laptop computer.

Referring to FIG. 2, illustrated is a portable, notebook size computer designated 26 comprising a self-contained system, such as that illustrated at 10 in FIG. 1, and including a hinged top or lid 28 rotatable about a hinge or hinges 30 from a nested position "N," with a horizontal base 32, to a substantially vertical or open position "V". Opening of the notebook style portable computer by manipulation of a latch 34, reveals a plurality of keys 36 on a keyboard 31 of base 32, and a monitor screen 40 mounted in lid or top 28. A lower portion 32a of base 32 includes heat generating components, and an upper portion 32b of base 32 supports the keyboard 31.

Figure 3:
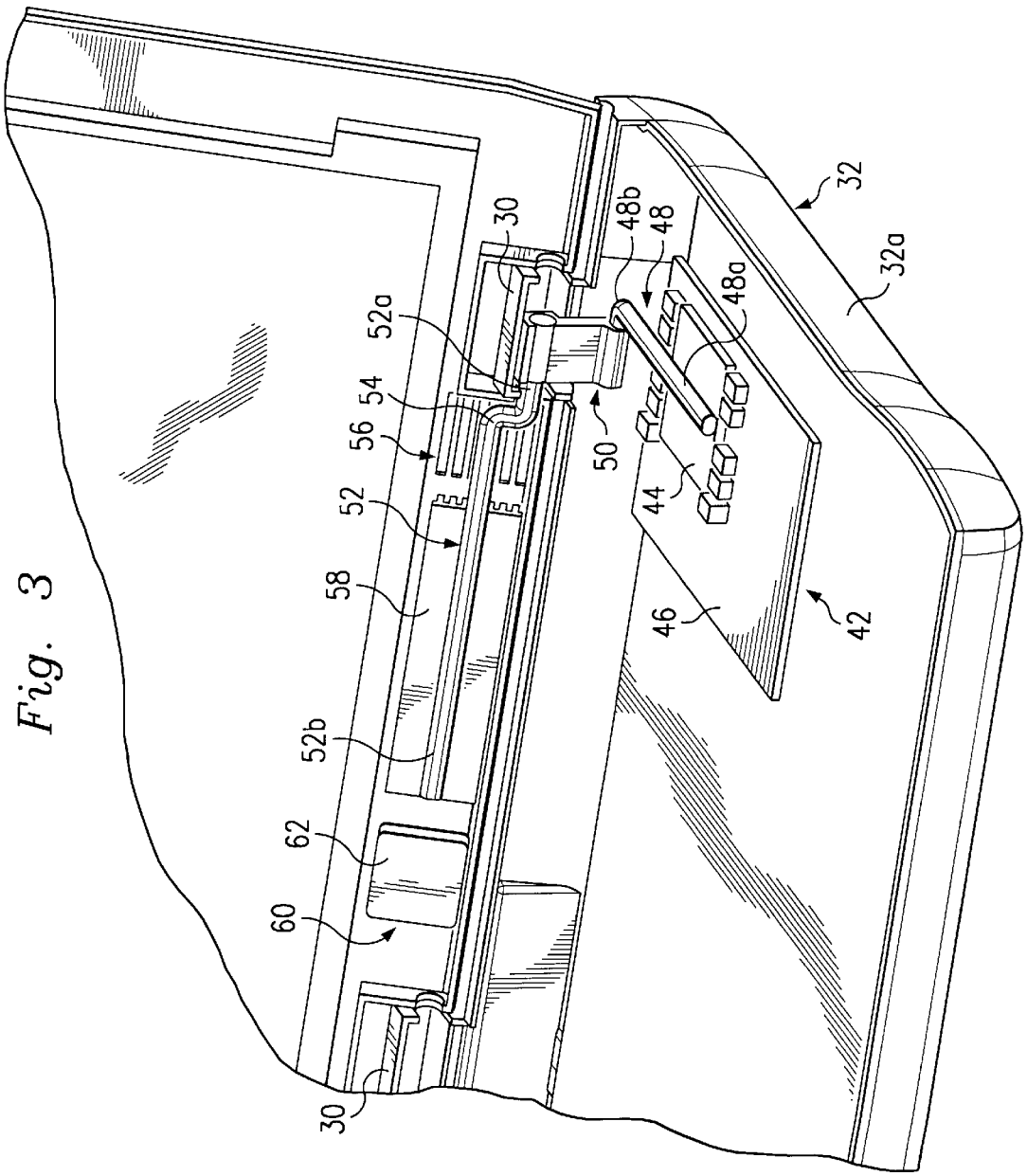
FIG. 3 is a partial perspective view illustrating an embodiment of a laptop computer and component mounted therein.

As it can be seen in FIG. 3, a heat generating component such as a processor module 42 is mounted in the lower portion 32a of base 32. For purposes of this discussion, the upper portion 32b of base 32 is removed to reveal the processor module 42. Other well known components are also mounted in lower portion 32a of base 32, but are not illustrated. Some of these components include an audio subsection, a CD floppy module section, a battery bay section, a hard-disk drive section, and a motherboard.

A metallic heat spreader plate 44 is flush mounted in heat transferring contact with an upper surface 46 of processor module 42. A first heat pipe section 48 has a first end 48a in heat transferring contact with the heat spreader plate 44. A second end 48b of first heat pipe 48 is fixedly mounted in a metallic thermal hinge 50. Thermal hinge 50 is stationarily mounted in base 32 adjacent hinge 30 which pivotally attaches lid 28 to base 32 as discussed above. With a bezel removed from lid 28, a second heat pipe section 52 is illustrated and includes a first end 52a rotatably mounted in thermal hinge 50. A thermal grease may be used in the rotating connection between first end 52a of heat pipe section 52 and thermal hinge 50. A bend or elbow portion 54 of second heat pipe section 52 is adjacent a vent 56 formed in lid 28. A second end 52b of second heat pipe section 52 is in heat transferring contact with a heat sink 58 mounted in lid 28. A well known cooling fan unit 60 is mounted in lid 28 and includes a shroud 62 for concentrating exhaust air flow to the cooling fan unit 60. An axis of rotation of first end 52a of heat pipe 52 in thermal hinge 50 is co-axial with an axis of rotation of hinges 30, so that when lid 28 is rotated, second heat pipe section 52 rotates in thermal hinge 50.

Figure 4:
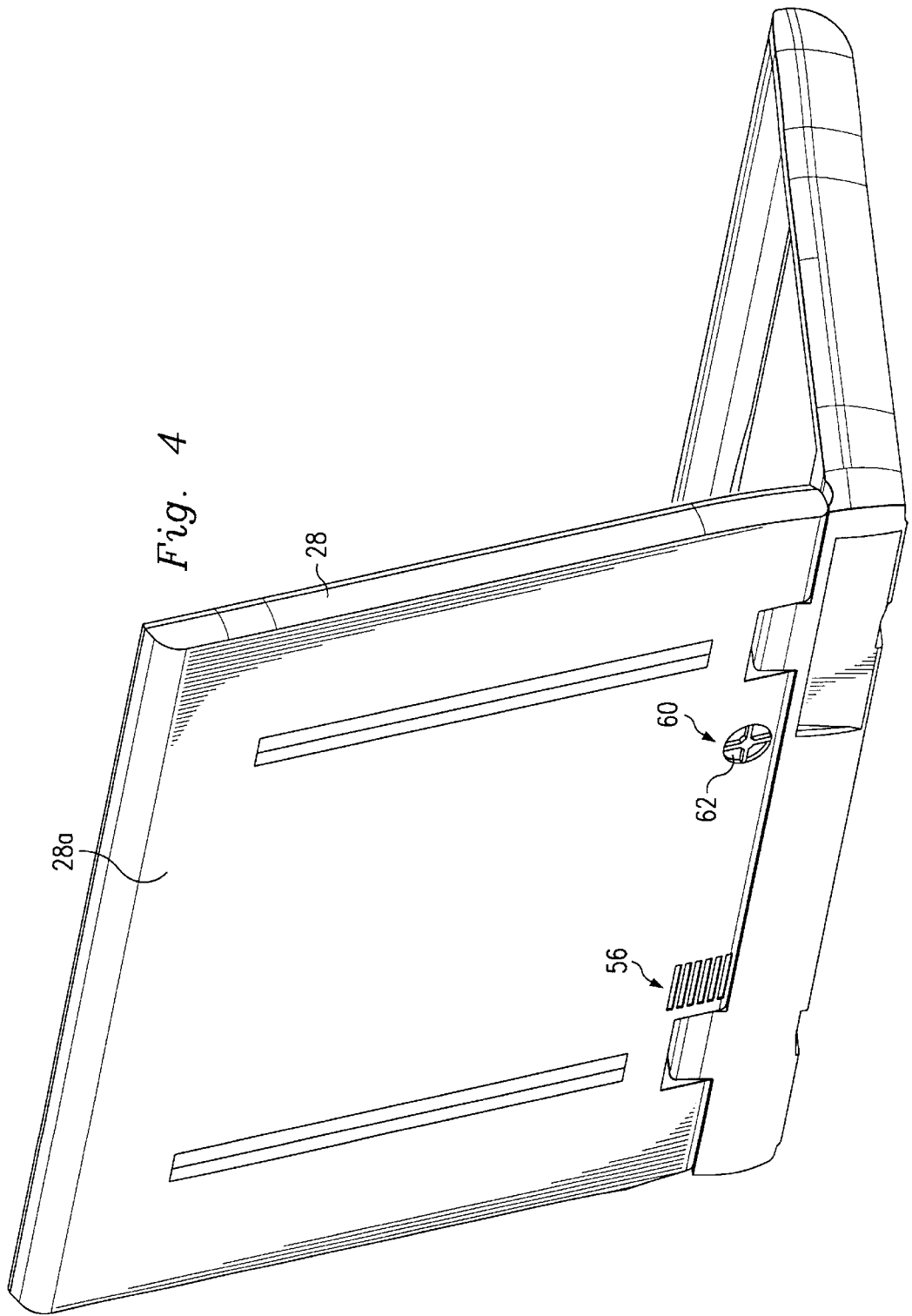
FIG. 4 is another perspective view illustrating an embodiment of a laptop computer.
Figure 5:
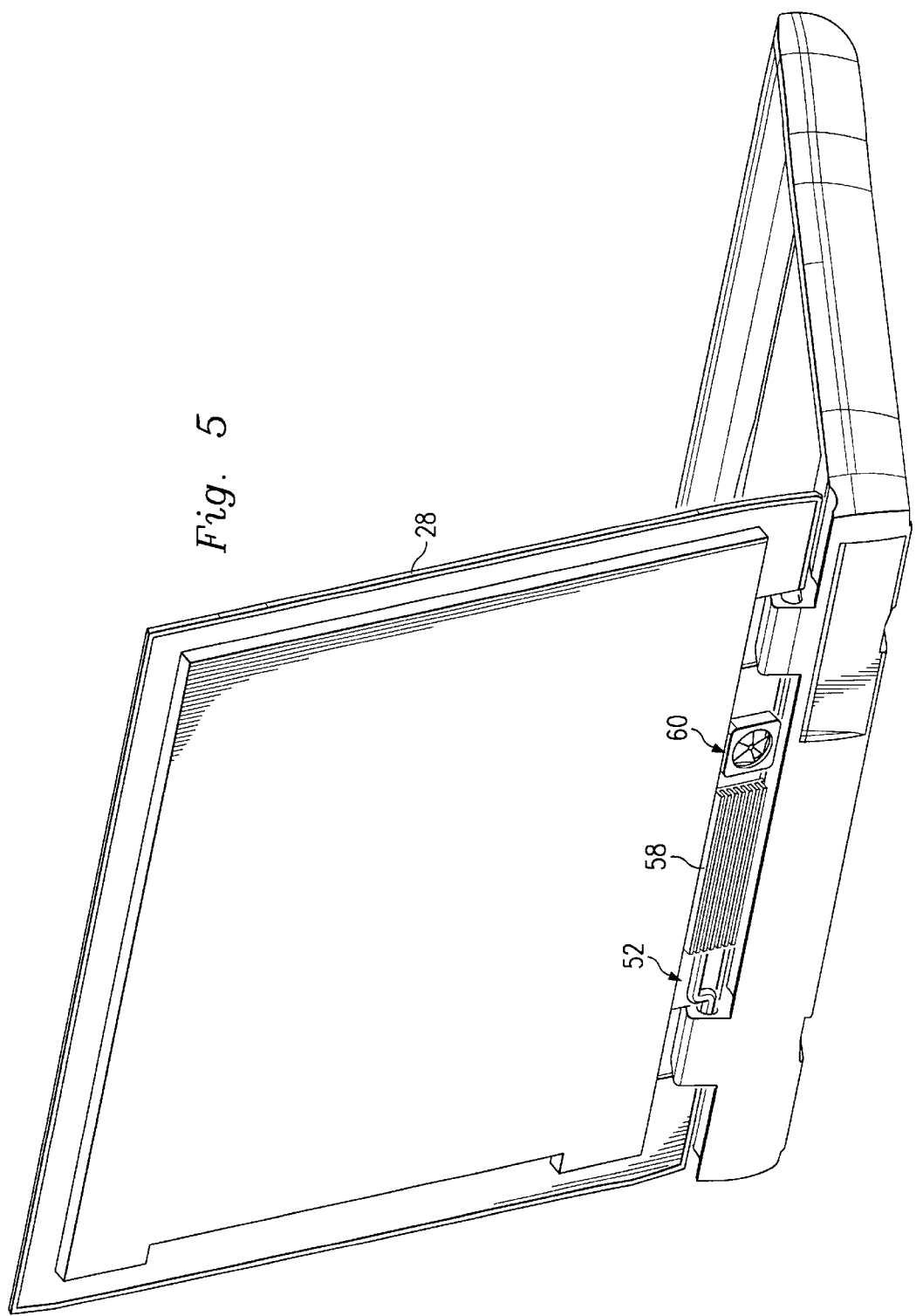
FIG. 5 is another perspective view illustrating an embodiment of a laptop computer.

Another view, FIG. 4, illustrates a view of lid 28 including vent 56 formed in a cover portion 28a of lid 28, and a distally spaced fan cover 64 adjacent fan unit 60. In a further view, FIG. 5, cover portion 28a is removed providing an exposed view of lid 28 including second heat pipe section 52 extending to heat sink 58 adjacent the cooling fan unit 60.

In operation, heat generated in base 32 by processor module 42 is passively dissipated to heat spreader plate 44 and first heat pipe section 48, and is further passively dissipated from first heat pipe section 48 in base 32, to second heat pipe section 52 in lid 28 via thermal hinge 50. Even further passive heat dissipation occurs in lid 28 due to the heat transferring contact between second heat pipe section 52 and heat sink 58. Heat is actively dissipated in lid 28 due to air being drawn in through vent 56 by fan unit 60, over second heat pipe section 52 and heat sink 58, and exhausted from lid 28 through fan cover 64.

As a result, one embodiment provides a portable computer heat transfer system comprising a portable computer including a base portion and a lid portion pivotally connected to the base portion. A heat generating component is mounted in the base portion. A first heat transfer system is mounted in the base portion adjacent the heat generating component. A second heat transfer system is mounted in the lid portion. A thermal hinge is provided for interconnecting the first heat transfer system with the second heat transfer system so that heat is dissipated from the base portion to the lid portion.

Another embodiment provides an active and passive cooling system for a computer comprising a portable computer including a base portion and a lid portion pivotally connected to the base portion. A heat generating component is mounted in the base portion. A passive heat transfer system is mounted in the base portion adjacent the heat generating component. An active heat transfer system is mounted in the lid portion. A pivoting means is mounted between the base portion and the lid portion for thermally interconnecting the passive heat transfer system with the active heat transfer system, so that heat is dissipated from the base portion to the lid portion.

Another embodiment provides a microprocessor and an input coupled to provide input to the microprocessor. A mass storage is coupled to the microprocessor. A display is coupled to the microprocessor by a video controller. A memory is coupled to provide storage to facilitate execution of computer programs by the microprocessor. A base portion of a portable computer and a lid portion thereof are pivotally interconnected. A heat generating component is mounted in the base portion. A first heat transfer system is mounted in the base portion adjacent the heat generating component. A second heat transfer system is mounted in the lid portion. A thermal hinge pivotally interconnects the first and second heat transfer systems to dissipate heat from the base portion to the lid portion.

As it can be seen, the principal advantages of these embodiments are that heat is transferred out of the base portion of the portable computer to the lid portion, thus conserving valuable component space in the base portion. The lid portion includes an active and passive heat dissipating system including a combination of a heat pipe, a heat sink and a fan. This is possible due to a thermal hinge which provides a heat transfer connection between a heat generating component in the base and an active thermal solution in the lid.

A further embodiment provides a method of transferring heat in a portable computer comprising pivotally interconnecting a lid portion of a portable computer to a base portion thereof. A heat generating component is mounted in the base portion. A first heat transfer system is mounted in the base portion adjacent the heat generating component and a second heat transfer system is mounted in the lid portion. A thermal hinge is mounted between the base portion and the lid portion for interconnecting the first heat transfer system with the second heat transfer system so that heat is dissipated from the base portion to the lid portion.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A portable computer heat transfer system comprising:
    a portable computer including a base portion and a lid portion pivotally connected to the base portion;
    a heat generating component mounted in the base portion;
    a first passive heat transfer system mounted in the base portion adjacent the heat generating component;
    a second active and passive heat transfer system mounted in the lid portion;
    a thermal hinge for interconnecting the first passive heat transfer system in series with the second active and passive heat transfer system, so that heat is dissipated from the base portion to the lid portion;
    the first passive heat transfer system including a heat spreader plate connected to a first heat pipe; and
    the second active and passive heat transfer system including a heat sink connected to a second heat pipe and a fan mounted in the lid portion adjacent the heat sink.

2. The system as defined in claim 1 where the thermal hinge is connected to the first heat pipe and the second heat pipe.

3. The system as defined in claim 1 wherein the base portion and lid portion are interconnected by a lid hinge.

4. The system as defined in claim 1 wherein the second heat pipe is rotatabley mounted in the thermal hinge, and the lid portion includes a vent formed therein adjacent a first end of the second heat pipe.

5. The system as defined in claim 2 wherein one of the first and second heat pipes is pivotally connected to the thermal hinge.

6. The system as defined in claim 3 wherein the second heat pipe is rotatably mounted in the thermal hinge about an axis of rotation which is coaxial with an axis of rotation of the lid hinge.

7. The system as defined in claim 4 wherein a second end of the second heat pipe is engaged with the heat sink, and a fan is mounted adjacent the heat sink, whereby air is drawn into the vent, across the second heat pipe and the heat sink, and exhausted from the lid portion by the fan.

8. An active and passive cooling system for a computer comprising:

a portable computer including a base portion and a lid portion pivotally connected to the base portion;

a heat generating component mounted in the base portion;

a first passive heat transfer system including a first heat pipe mounted in the base portion adjacent the heat generating component;

a second active and passive heat transfer system including a second heat pipe mounted in the lid portion and connected to the first heat pipe and a fan mounted in the lid portion adjacent the second heat pipe; and means mounted between the base portion and the lid portion for thermally and pivotally interconnecting the first passive heat transfer system with the second active and passive heat transfer system, so that heat is dissipated from the base portion to the lid portion.

9. A computer system comprising:

a microprocessor;

an input coupled to provide input to the microprocessor;

a mass storage coupled to the microprocessor;

a video controller coupled to the microprocessor;

a memory coupled to provide storage to facilitate execution of computer programs by the microprocessor;

a portable computer base portion;

a portable computer lid portion pivotally connected to the base portion;

a heat generating component mounted in the base portion;

a first passive heat transfer system mounted in the base portion adjacent the heat generating component;

a second active and passive heat transfer system mounted in the lid portion;

a thermal hinge for pivotally interconnecting the first passive heat transfer system with the second active and passive heat transfer system, so that heat is dissipated from the base portion to the lid portion;

the first passive heat transfer system including a heat spreader plate connected to a first heat pipe; and the second active and passive heat transfer system including a heat sink connected to a second heat pipe; and a fan mounted in the lid portion adjacent the heat sink.

10. The system as defined in claim 9 wherein the thermal hinge is connected to the first heat pipe and the second heat pipe.

11. The system as defined in claim 9 wherein the base portion and lid portion are interconnected by a lid hinge.

12. The system as defined in claim 9 wherein the second heat pipe is rotatable mounted in the thermal hinge, and the lid portion includes a vent formed therein adjacent a first end of the second heat pipe.

13. The system as defined in claim 10 wherein one of the first and second heat pipes is pivotally connected to the thermal hinge.

14. The system as defined in claim 11 wherein the second heat pipe is rotatably mounted in the thermal hinge about an axis of rotation which is coaxial with an axis of rotation of the lid hinge.

15. The system as defined in claim 12 wherein a second end of the second heat pipe is engaged with the heat sink, and a fan is mounted adjacent the heat sink, whereby air is drawn into the vent, across the second heat pipe and the heat sink, and exhausted from the lid portion by the fan.

16. A method of transferring heat in a portable computer comprising the steps of:

pivotally connecting a lid portion of a portable computer to a base portion thereof;

mounting a heat generating component in the base portion;

mounting a first passive heat transfer system in the base portion, including a heat spreader plate connected to a first heat pipe, adjacent the heat generating component;

mounting a second active and passive heat transfer system in the lid portion, including a heat sink connected to a second heat pipe and a fan mounted adjacent the heat sink; and mounting a thermal hinge between the base portion and the lid portion for interconnecting the first passive heat transfer system with the second active and passive heat transfer system, so that heat is dissipated from the base portion to the lid portion.

* * * * *